United States Patent [19]

Kirtley, Jr. et al.

[11] Patent Number: 4,608,700
[45] Date of Patent: Aug. 26, 1986

[54] SERIAL MULTI-DROP DATA LINK

[75] Inventors: James L. Kirtley, Jr., Brookline, Mass.; Thomas L. Sterling, Palm Bay, Fla.; Ronald D. Williams, Charlottesville, Va.

[73] Assignee: Massachusetts Institute of Technology, Cambridge, Mass.

[21] Appl. No.: 417,763

[22] PCT Filed: Jul. 23, 1981

[86] PCT No.: PCT/US81/00986

§ 371 Date: Jul. 29, 1982

§ 102(e) Date: Jul. 29, 1982

[51] Int. Cl.$^4$ .............................................. H04B 3/00
[52] U.S. Cl. ....................................... 375/36; 370/85; 364/900
[58] Field of Search .................... 375/36, 121; 370/85, 370/89, 94, 95; 340/825.06, 825.14, 825.5, 825.54, 825.59; 364/900 MS File

[56] References Cited

U.S. PATENT DOCUMENTS

| | | | |
|---|---|---|---|
| 3,786,418 | 1/1974 | Nick | 375/36 |
| 4,006,465 | 2/1977 | Cross | 375/36 |
| 4,106,104 | 8/1978 | Nitta et al. | 364/900 |
| 4,225,919 | 9/1980 | Kyu et al. | 370/85 |
| 4,229,791 | 10/1980 | Levy et al. | 364/200 |
| 4,271,505 | 6/1981 | Menot | 370/85 |
| 4,271,510 | 6/1981 | Looschen | 375/36 |
| 4,320,467 | 3/1982 | Glass | 364/900 |
| 4,320,502 | 3/1982 | De Veer | 370/94 |
| 4,334,288 | 6/1982 | Booher | 364/900 |
| 4,357,605 | 11/1982 | Clements | 340/310 R |
| 4,373,183 | 2/1983 | Means et al. | 370/85 |
| 4,380,052 | 4/1983 | Shima | 364/900 |
| 4,394,728 | 7/1983 | Comfort et al. | 364/200 |
| 4,402,040 | 8/1983 | Evett | 364/200 |
| 4,408,300 | 10/1983 | Shima | 364/900 |
| 4,411,004 | 10/1983 | Graham | 375/36 |
| 4,445,214 | 4/1984 | Reynold et al. | 370/85 |
| 4,451,881 | 5/1984 | Grice et al. | 370/95 |

Primary Examiner—Benedict V. Safourek
Assistant Examiner—Stephen Chin
Attorney, Agent, or Firm—Thomas J. Engellenner; James E. Maslow

[57] ABSTRACT

A digital data link for communication between distributed components including at least two serial paths, a data path and a control path, and a port associated with each component, the ports serving to arbitrate link access requests, permit dialog with minimal addressing between components and promote effective utilization of the data path bandwidth.

15 Claims, 10 Drawing Figures

Single pulse, pulse width modulated

Double pulse, pulse width modulated, self timed

Manchester encoded

SERIAL MULTI-DROP DATA LINK

This application is based upon, and claims priority of, International Appliation No. PCT/US81/00896 filed July 23, 1981.

TECHNICAL FIELD

The field of this invention is data communications and more specifically apparatus and methods for linking components in distributed communication systems.

BACKGROUND ART

There is a need for an efficient, simple and economical means of communication between controllers, sensors, and controlled devices in distributed systems. The types of systems which would benefit greatly from such a communications system include, but are not limited to, distributed energy systems such as heating and air conditioning, other process systems, distributed alarm systems for fire and intrusion, and many others. The requirements for such a communication system are economy, for obvious reasons, simplicity of interconnection, to make the system useful for a wide range of applications, and efficiency of message arbitration and addressing, to allow use with low bandwidth media.

There have been several different local communications links developed in recent years. Some of these local networks provide one-way communications from a single, fixed terminal. These links, for example, the one marketed by BSR, Inc., are adaptable to a variety of applications.

Another form of local network uses a single data path and an arbitration scheme which depends upon detection of collisions and re-transmission with a random time delay. This type of system is typified by ETHERNET, presently marketed by Xerox Corporation.

Another form of local network avoids most collisions by assigning each port a time slot, which rotates through all terminals in the network. Such networks are known as "token" networks, because the time-slot assignment is mediated by passing around a "token", or special symbol. This type of network is typified by CHAOSNET.

Yet another form of local network is the IEEE STD-488 instrumentation bus, which uses a master controller to handle all communications.

The subject invention is intended to fill a need which is not quite met by any of the above mentioned local networks. It provides two-way communications with low cost and high utilization of the communications medium.

DISCLOSURE OF THE INVENTION

In general this invention comprises a communications network and in particular a linked network which permit efficient communication among associated components. In a simple embodiment, there are two paths for information transfer. These are referred to herein as the data and control paths. The data path carries, in the preferred embodiment, three types of information, which are handled differently by the network ports. The control path carries bus access requests of different immediacy levels. The second part of the communication network is the collection of ports. These ports are identical to each other, and are of such nature as to be producible as large-scale integrated circuits. The ports and the data and control paths are collectively referred to as the link herein.

Each of the ports is connected to a device which the port serves, referred to here as the associated component. The associated components may be as simple as a switch, or as complicated as a computer. The associated component initiates any action of the link port, and accepts information transferred to it from the link by the link port.

Access to the link is requested by a link port by sending a signal on the control path. One of the most important features of this link is distributed arbitration. For example, when one link port requests access to the link, all ports may be made aware of the request. Each port can then keep track of all pending requests at each immediacy level. When a device is in control of the data path (or "bus"), it is known as the master. When the master reliquishes control, it sends a special symbol on the data path, this special symbol being the end of function (EOF). When the link ports receive an EOF, they decrement their count of pending requests. A port with a pending request knows that it can become master when all pending requests of higher priority have been cleared by successive EOF's.

This communications link is capable of supporting communications with different immediacy levels. The immediacy level of a request is determined by the port making the request. Within each immediacy level, messages may be handled in a first-in, first-out fashion.

The effect of distributing the arbitration function is to free the system from any need for a link controller. In fact, the link medium can be completely passive, providing a high degree of inherent reliability. The effect of using a separate control path and short bus access request signals is to reduce to negligible levels the probability of collisions between messages. The reason for this is that each port knows when it can begin sending on the data path. Messages on the control path are very short, will occupy the control path only a very small part of the time, and so will have a small probability of collision. Further, with a separate control path, collision detection and arbitration through random re-transmission, a well-known technique, has the ability to clear any collision which may occur without affecting, to any great extent, information flow on the data path.

In the preferred embodiment, the link is always in one of several states which define certain specialized tasks to be performed by the link elements. For example, when the link is in the state referred to in this application as "sid", for "slave identification", each of the elements of the link accepts information on the data path and interprets that information as an address. If a link port identifies its own address, it assumes the status of slave. Similarly, the "ssd", or "slave sends data" state alerts the slave port that it is to alert its associated component to start sending data. The link state can be set and modified by the port which is currently link master. All of the ports can keep track of the link state, and react to changing link state in the appropriate way.

The distributed link state concept leads to a very simple method for dialog. The procedure is that the port which is master first identifies a slave port, then by changing the link state, it can specify first that the slave sends data or that the master sends data. The former establishes a signal path leading from the component associated with the slave to the component associated with the master, the latter establishes a signal path in the reverse direction. This dialog makes certain common types of communications much more efficient, because the overhead associated with identifying a destination address and gaining access to the bus is reduced by a factor of two or more in the case of multiple dialog situations.

PREFERRED EMBODIMENT

Figure 1:
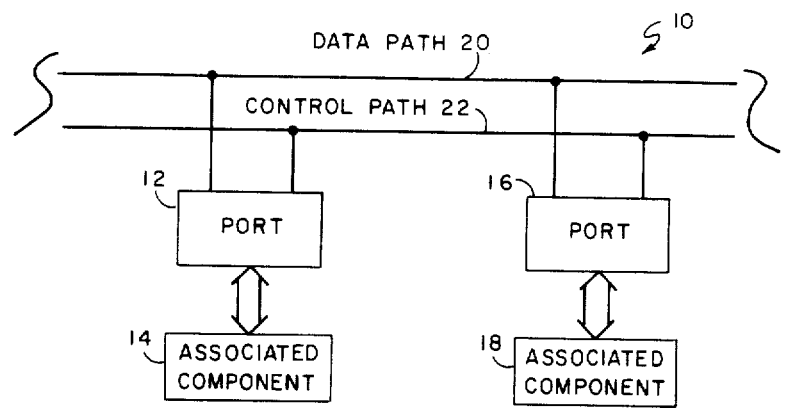
FIG. 1 is a general schematic diagram of a system embodying the present invention.

In FIG. 1 a general overview of a system 10 employing our invention is shown. Associated components 14 and 18 (as well as others not shown) are linked by two paths, a data path 20 and a control path 22. This invention does not restrict the nature of these paths. They could consist of discrete wire pairs, frequency multiplexed signals on a cable or on power distribution wires, radio signals, optical signals, or other forms of communications signals.

Connecting associated components 14 and 18 to the paths are ports 12 and 16, respectively. The ports 12 and 16 handle major communications functions, including message arbitration. In the preferred embodiment these ports keep track of the link state, and in so doing handle message addressing and dialog.

Figure 2:
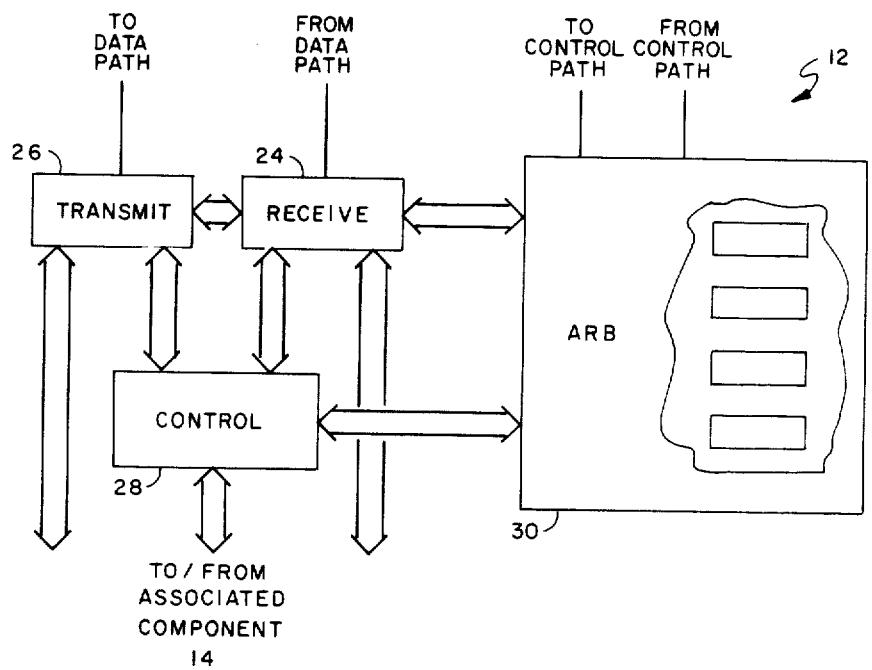
FIG. 2 is a general schematic diagram of a link port.

In FIG. 2 the basic operations of port 12 are detailed. Port 12 comprises four basic units functionally: a receive unit 24, a transmit unit 26, a control unit 28 and an arbitration unit 30. However, it should be recognized that, in manufacture, the port may fabricated as a whole and specific tasks, identified as falling within a specific unit can be combined with, or substituted for, hardware incorporated in other units. In our preferred embodiment the receive unit 24 and transmit unit 26 are connected to the data path 20 as well as the associated component 14. The arbitration unit 30 is connected to the control path 22 and the control unit 28 is connected to each of the other units 24, 26 and 30 as well as the associated component 14.

The arbitration unit 30 monitors the control path 22. It has means to keep track of the number of pending requests in several immediacy categories. These request counts are kept in a set of special registers. Whenever a bus access request is made by any of the ports, all ports increment the count for that category of request. Whenever a master port relinquishes control of the bus, all of the ports decrement their counts for the immediacy category of that port. The arbitration unit 30 also has means for transmitting a bus access request. Whenever it does so, it transfers the count for that immediacy category into a special register, which is decremented whenever the bus is relinquished by a master in the immediacy category pending. When this register reaches zero, the requesting port becomes bus master.

The arbitration unit 30 notifies the control unit 28 at that point. The arbitration unit 30 also has means for detecting collisions on the control path 22, and for retransmitting a bus request signal following collision, after a quasi-random delay.

The control unit 28 has several functions. It decodes access request signals from the associated component 14 and initiates bus access requests to the system, through the arbitration unit 30. In the preferred embodiment, the control unit 28 encodes bus control words and passes them on to the transmit unit 26 for transmission. The control unit 28 receives notification from the arbitration unit 30 when the port becomes master, and in turn notifies the associated component. The control unit 28 receives the bus state from the receive unit 24 (in the preferred embodiment), and notifies the associated component when appropriate. For example, when the bus is in "ssd" state and the port has slave status, the control unit 28 initiates transmission of data from the associated component 14.

The receive unit 24 is connected to the data path 20. It receives data and when appropriate passes that data on to the associated system component 14. In the preferred embodiment the receive unit 24 keeps track of bus state, and decodes command words on the data path to update the bus state. In the preferred embodiment, the receive unit 24 has means to pass data to the associated component 14 when this is appropriate, but in certain bus states, such as "sid", data is to be used only by the receive unit 24 so that data is not passed on. In the preferred embodiment, the receive unit 24 is adapted to recognize address signals, and is adapted to hold the address of the port. The receive unit 24 has means for detecting collisions on the data path 20. In appropriate circumstances the receive unit 24 initiates a condition known as "mumble", in which a collision is known to have occured and from which the bus cannot recover gracefully. This condition is passed on to the transmit unit, which generates a bus jam signal.

The transmit unit 26 has means for sending data to the data path 20. This data may be initiated either by the control unit 28 or by the associated component 14. The transmit unit 26 has means for implementing a transmit signal from the associated component.

Access requests to the bus are initiated by the associated component 14, which brings active one of the inputs to the control unit 28. The control unit 28 encodes that request and relays it to the arbitration unit 30 which sends the request, in appropriate form, onto the control path 22.

This bus access request is received by all ports on the link, and all ports increment their counts of requests in this immediacy category. Whenever an EOF in this immediacy category is received, the port decrements its count of pending requests in line ahead of it. When this count goes to zero, the port 12 notifies its associated component 14 that it is now bus master.

When it is bus master, the associated component 14 sets system state and/or sends data. In the preferred embodiment, a transmission sequence will be a series of control words interspersed with data. One such sequence, out of many possible, would start with the control word "sid", then a slave address, followed by the control word "msd" (master sends data), followed by a string of data, then the control word "ssd" (slave sends data), at which point the slave port is expected to send a string of data, terminated by the special end of transmission character. The master port can continue to identify slave ports and send and receive data. When it is done with the bus, the master sends the special EOF character, itself a command word, relinquishing the bus.

In a simplified embodiment, there is only one control word, EOF. In this embodiment all data on the bus is passed through to the associated component 14. The associated component 14 would then keep track of addressing. Dialog on this bus would be carried out as multiple transmissions.

Figure 3:
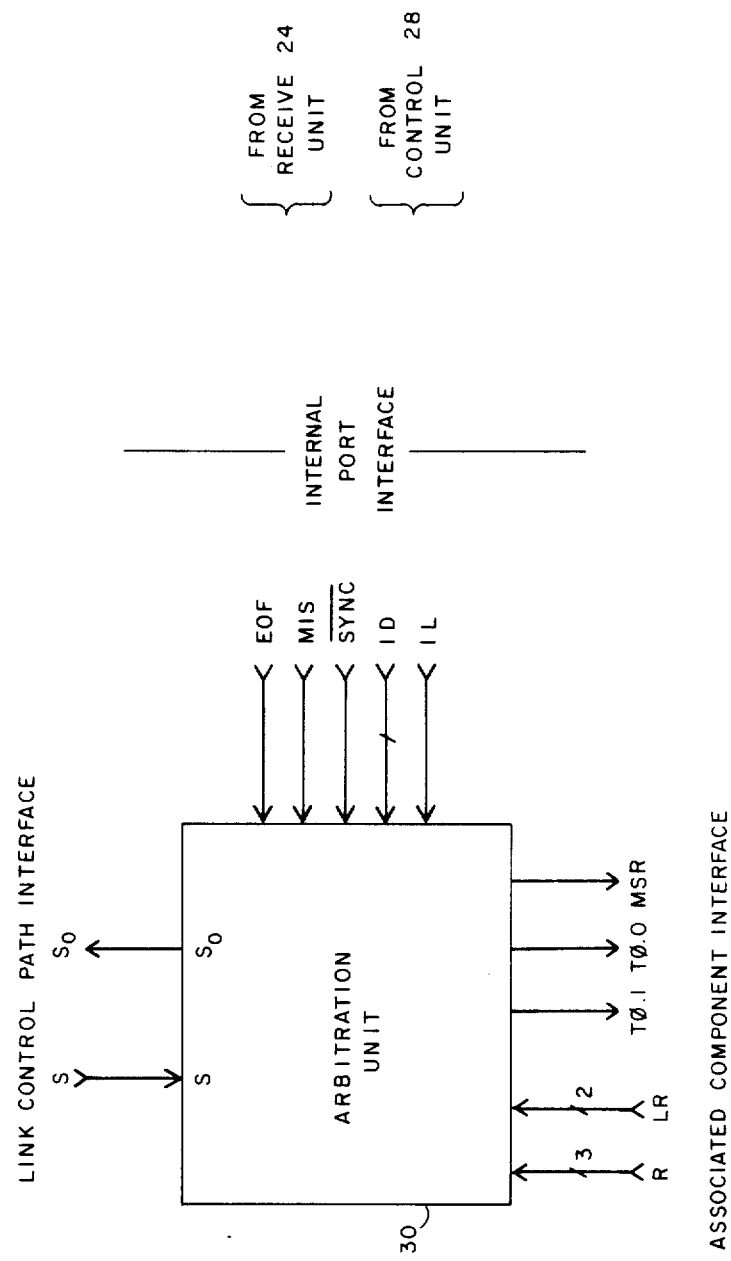
FIG. 3 is a general schematic diagram of the link port's arbitration functions.

In FIG. 3 the input and output signals of an arbitration unit 30 are detailed. The interface of the arbitration unit 30 with the associated component 14 comprises two sets of inputs and three sets of outputs. The R input lines determine the speed of message transfer and bit width. The number of lines is dependent on the number of choices provided by the particular realization of the invention. The L input lines serve to request access to the link. The number of lines used is dependent on the form of encoding and the number of levels of immediacy recognized. The signals are asserted when the link is required and removed when the link is relinquished. The primary output from the arbitration unit 30 to the associated component 14 is the MSR single line signal. MSR is active when the port is master. The T output lines are used to indicate timing information to the system level device. The number of T lines is determined by the type of encoding employed and the number of timing groups differentiated in specific realizations. The T output indicates between which two bounds the amount of access time remains to the master. This may be a function of both the amount of time the master has already occupied the link and the type and amount of pending requests.

The internal port interface connects the arbitration unit 30 to the other units of the port. The EOF signal is produced by the receive unit 24 and indicates that the master has just relinquished the data path. The MIS signal is also derived from the receive unit 24 and is a input which indicates that the data path is in use. The SYNCH input comes from the control unit 28 and is active when an out of synchronization condition occurs. For one of several reasons, the control unit 28 may determine that the link arbitration state and the port arbitration registers may not be coincident. The SYNCH signal conveys that to the arbitration unit. The ID/IL inputs load a random number into the arbitration unit to assure a unique delay by that port with respect to similar delay of all of the other ports. One possibility is to use the unique identification number of the port which is obtained from the receive unit. The CHAOS input comes from the control unit and causes the arbitration unit to relinquish the master state.

The link control path interface connects the arbitration unit 30 to the control path 22. The S input is the signal on the control path 22. The $S_o$ output signal is the information from the arbitration unit 30 before it is superimposed on the control path. The $S_o$ signal does not reflect the contents of the S path contributed by the other ports.

The link is capable of differentiating among several levels of immediacy. One possible implementation can recognize three different immediacy levels, which are referred to as BAR, INT, and URG from the lowest to the highest level respectively.

Figure 4A:
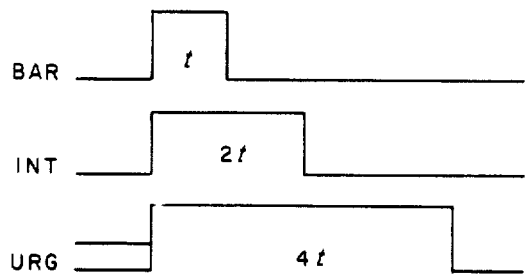
FIGS. 4a, 4b and 4c are examples of code sequences for signals on the control path of the invention.
Figure 4B:
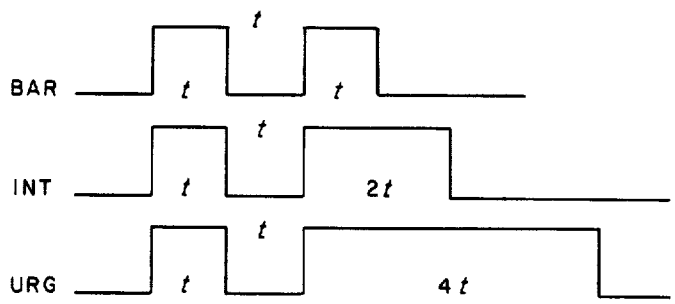
Figure 4C:
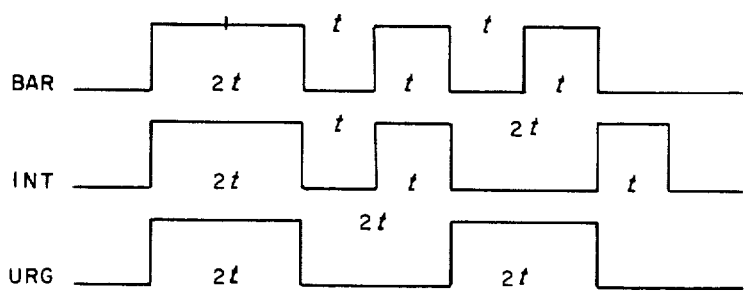

In FIGS. 4a, 4b and 4c different encoding formats are shown. Pure pulse width modulation is shown in FIG. 4a, where the length of a single pulse determines the immediacy declared. A variation is shown in FIG. 4b in which each immediacy signal is specified by two pulses, the first of a fixed length to provide timing and the second pulse similar to the pulse width modulation used originally. This technique is a type of self timing. A third encoding technique is shown in FIG. 4c and uses a Manchester type coding for self timing with shorter message duration than the previous method.

Figure 5:
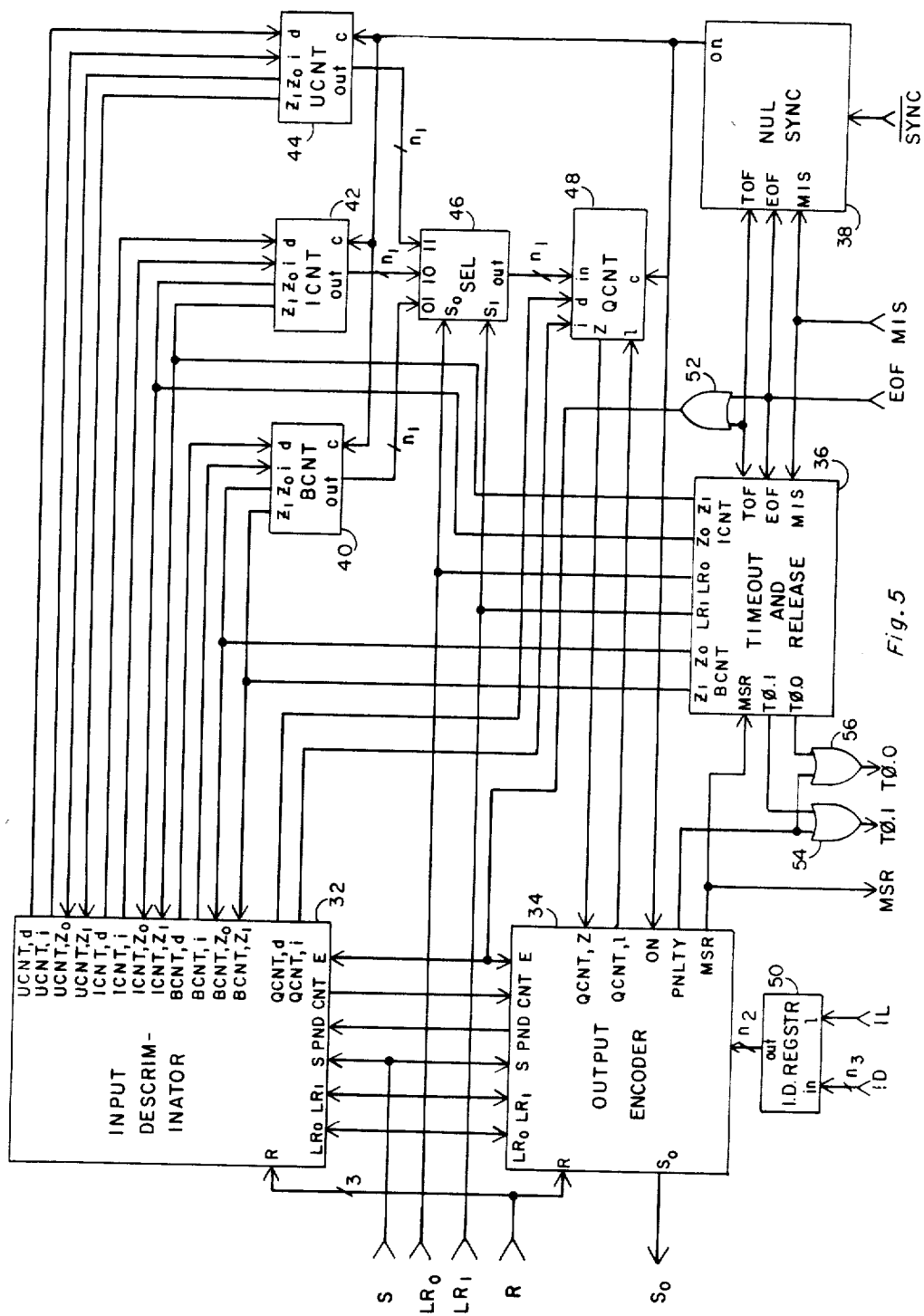
FIG. 5 is a detailed schematic diagram of a link port's arbitration unit.

In FIG. 5 a specific implementation of an arbitration unit is shown. For purposes of illustration in the figure, it is assumed that there are three levels of immediacy for a particular implementation. The arbitration state registers 40, 42 and 44 are labelled BCNT, ICNT, and UCNT respectively as they relate to the BAR, INT, and URG levels of immediacy. The contents of each register is equal to the number of pending requests of its respective immediacy type.

Alternately, the contents of the arbitration state registers may be functions of the number of pending requests of the immediacy types. An example of the later case is that the contents of the BCNT register 40 be equal to the total number of pending requests, that the contents of the ICNT register 42 equal to the sum of the pending INT and URG requests and that the contents of the UCNT register 44 be equal to the number of pending URG requests. Each arbitration state register may be incremented by one, decremented by one and cleared by signals applied to the "i", "d", and "c" inputs respectively. It can also be specified that the registers are unable to pass their modulus, that is they can not decrement below all binary 0's or increment above all binary 1's. The "c" input overrides all other inputs and the simultaneous application of the "i" and "d" inputs produces no change in register state. Outputs from each of the registers include "out" which is an n bit signal where n is the number of bits for each arbitration state register, "$Z_i$" which is the logical sum of all but the lowest significant bit of the register, and "$Z_o$" which is the inverted contents of the lowest significant bit of the register. The number of bits, n, in each register is dependent on the specific realization of the link. For small commercial and residential applications, 8 bits should be satisfactory.

The port queue register 48 is used to determine when the port 12 in which it is contained becomes master. The contents of the port queue register 48 is a function of the number of pending requests which are to be serviced prior to the port acquiring master status. The register 48 is similar to the arbitration state registers 40, 42 and 48 with the additional provision for loading input data, either serially or in parallel, via the "in" set of lines under the control of the "1" input signal. In the chosen embodiment, the contents are equal to the number of pending requests of the particular immediacy level for which the access request was made by the port. When no access request is pending by port 12, its queue register 48 is not used.

The selector 46, also labelled SEL, connects the outputs of the arbitration state registers 42, 44 and 40 with the input of the port queue register 48. Depending on the specific realization and the interpretation of the contents of the registers, the selector 46 transforms its inputs into the correct valued output for the queue register 48. In this embodiment, the contents of the arbitration state register 40, 42 or 44 which is associated with the immediacy level of the access request are loaded directly into the queue register 48 without modification. For this interpretation the selector 46 is an n by 4 bit multiplexer circuit which chooses one of four words depending on the 2 bit control input "$s_1/s_0$" which is provided by the "L" input lines to the arbitration unit. When the control inputs to selector 46 are "00" no arbitration state register is selected. When the control inputs to SEL are "01" the BCNT register 40 "out" signals are made available to the QCNT "in" input lines. When the control inputs to the selector 46 are "10", the ICNT register 42 "out" signals are made available to the QCNT "in" input lines. These signals are not actually loaded into the QCNT register 48 unitl the "1" input is strobed.

The input discriminater 32 maintains and updates the arbitration state registers 40, 42 and 44 and updates the port queue register 48. It accepts as inputs, the S signal from the control path, the R and L inputs from the external interface, the PND input from the output encoder 34, and the E input. This last input is the logical sum of the EOF input from the receive unit 24 and the TOF output from the timeout and release unit 36. In addition, the Z outputs from the arbitration state registers 40, 42 and 44 are monitored. The input discriminator 32 services the arbitration state registers 40, 42 and 44 by controlling their "i" and "d" inputs. It also controls the port queue register 48 "i" and "d" inputs. The input discriminator 32 remembers which immediacy level is associated with the current bus master. It interprets the control path S signal to determine the immediacy type request being made and increments the arbitration state registers 40, 42 or 44 appropriately. When PND is active, the input discriminator 32 will also increment the port queue register 48 upon receipt of an S message when appropriate. An active E signal causes the input discriminator 32 to decrement the arbitration state registers 40, 42 or 44 when appropriate. If PND is active, the port queue register 48 will be decremented when appropriate.

For the embodiment chosen, the behavior of the input discriminator 32 can be described. When an S signal is received and interpreted, the arbitration state register associated with the immediacy level is incremented. The port queue register 48 is never incremented. When an E signal is detected, the arbitration port register associated with the level of immediacy of the master which just relinquished the link is decremented. If PND is active and the L input indicates the same level of immediacy of the relinquishing master, then the port queue register 48 is also decremented. The input discriminator 32 also determines the level of immediacy associated with the new master when the E input signal is received. If the logical sum of the UCNT "$Z_1/Z_0$" outputs is active, then the new master is an URG type. If this is not the case, then if the logical sum of the ICNT "$Z_1/Z_0$" is active, the new master is of the INT immediacy type. If neither of these cases are true, and the logical sum of the "$Z_1/Z_0$" outputs of BCNT is active, the new master is of the BAR immediacy type. Finally, if the contents of all three registers is zero, then there is no new master and the arbitration state is NUL.

The output encoder 34 generates the $S_0$ output signal to the control path. It also loads the port queue register 48, provides the MSR signal, and imposes the penalty delay. When the L input from the external interface is set, the output encoder 34 begins the process to transmit the control path signal of the immediacy declared by the L input. The S input is monitored and if inactive, the $S_0$ signal is asserted. At the end of this signal, the port queue register 48 is loaded to reflect the waiting time before the port will become master. At this time, the PND output is set and is retained until the port becomes master. The output encoder remains in this condition until the QCNT "Z" input becomes zero, indicating that the port 12 is now able to take control of the data path. At this time, the PND output is reset and the MSR output is set. The output encoder 34 remains in this state until the L input is reset, or the T input lines are all ones indicating an overtime condition and entry into the PNLTY state, also setting the PNLTY output. As long as the output encoder 34 is in the PNLTY state, no further action will be taken in response to active L input signals. The output encoder includes a timer mechanism which determines how much time is left to the end of the PNLTY condition. If when the output encoder attempts to send the $S_0$ signal, S is active, a delay is introduced before the next attempt which is unique for each port. The output encoder 34 waits until the end of the active S signal, executes a short delay which is the same for all ports and then executes a second delay which is a function of the ID register 50. The ID register 50 is loaded by the receive unit 24 with the value of the unique identifying code of the port 12. Since this code is not shared by any other port, the delay will be different from that of any other port doing the same thing. After this second delay, the output encoder 34 tries again to send its signal on the control path. The rate of transmission is determined by the R input.

The purpose of the timeout and release unit 36 is to produce TOF signals, to limit the time of bus access according to the arbitration state registers, and to indicate overtime and thus start the PNLTY sequence for the active port and free the link.

The null synchronization unit 38 counts the number of successive TOF signals without MIS interruption and after a sufficient number, assumes the link to be in the null state. When SYNCH is active, this unit resets the ON output, clearing the arbitration state registers and disabling the output encoder. Once synchronization is achieved, ON is set again.

OR gates 52, 54 and 56 are also included in the embodiment of FIG. 5 to integrate the separate components.

Figure 6:
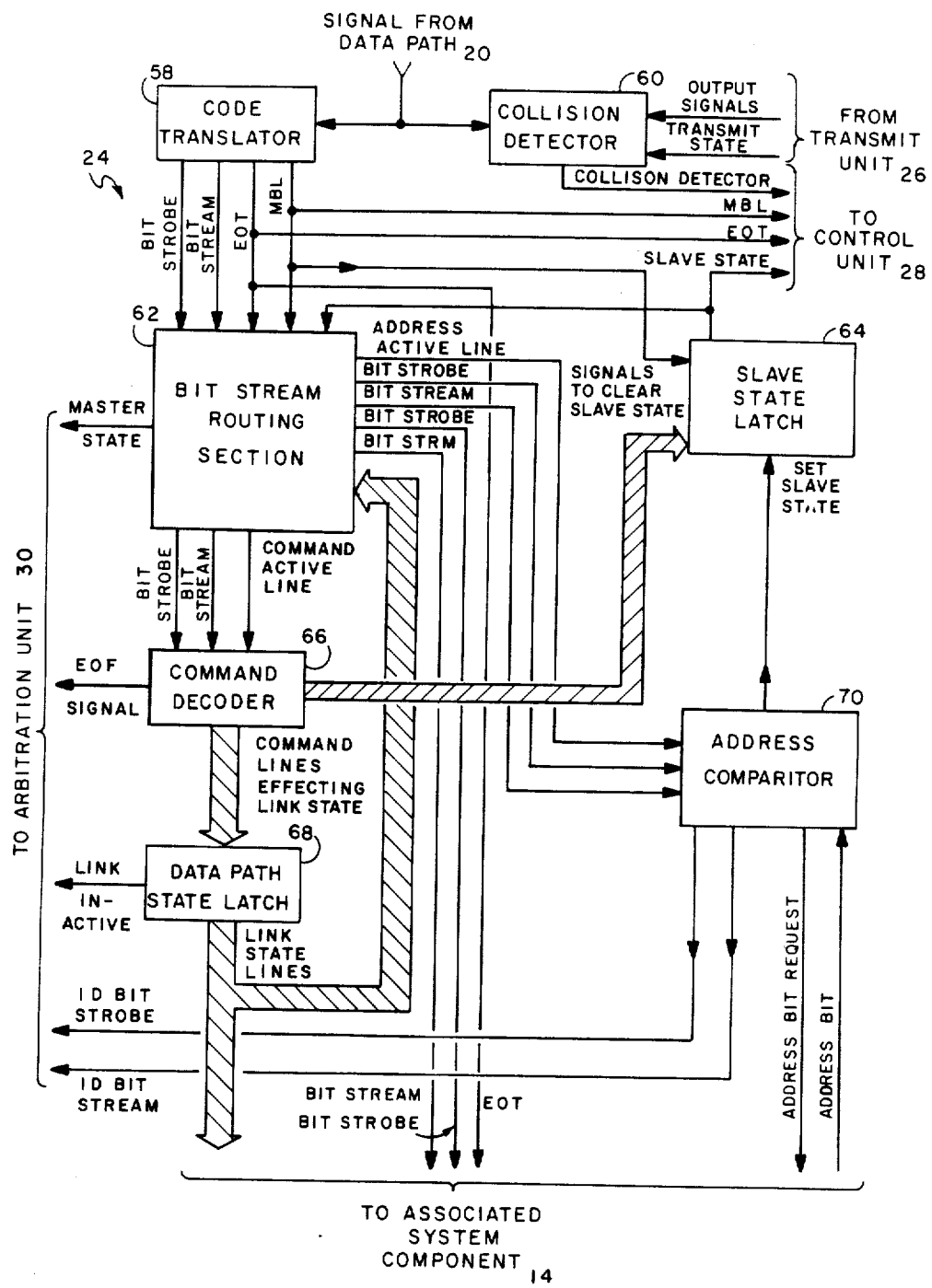
FIG. 6 is a detailed schematic diagram of a link port's receive unit.

In FIG. 6 the receive unit is detailed. The receive unit 24 may be divided into seven functional blocks as shown. Signal lines connect the receive unit 24 to the data path 20, the control unit 28, the arbitration unit 30, the transmit unit 26, and to the associated system component 14. The receive unit 24 serves as the input interface to the data path 20.

Bit streams on the data path 20 are preferrably encoded using a self timing code which provides four possible conditions for each digit. Self timing shall here be defined to mean that the code includes in its structure means by which a receiver can determine the rate of transmission of the message stream. A code incapable of providing this self timing feature could be used, but its use would necessitate the inclusion of a locally generated transmission rate signal to the receive unit. The four possible conditions for each digit should include at least two possible conditions which can be used to transfer binary digits at the transmission rate. The other two possible conditions are used for special signals on the data path 20. They may also have characteristics necessary for binary digit transfers, or they may be conditions whose occurence disrupts serial bit transfers. An example of a code which satisfies these specifications is the Manchester code, and this code is used in the preferred embodiment. The Manchester code uses a two state signal path; the signal may be either logically high or logically low. Between transmissions the path is logically low. The self timing feature is implemented by placing a timing bit at the beginning of each transmission. This timing bit is a signal which makes the path logically high for the period corresponding to one bit width. The receiver can extract the information bits from the path by observing the action of the path at intervals corresponding to the bit width. Binary digits are encoded as transitions occuring at those observation times. For example, a logical zero may be encoded as a transition on the path from logical high to logical low, and a logical one may be encoded as a transition on the path from logical low to logical high. The self timing feature is enhanced by this encoding of bit streams using transitions because the receiver can use the timing variation from the initial bit width to compensate for slight transmission rate drift during long transmissions. The Manchester code uses transitions at appropriate times as the two necessary conditions which can be used for the transfer of strings of binary digits. The code uses the lack of transitions to provide the other two necessary conditions. One of these conditions is no transition (logically low), and the other condition is no transition (logically high). The receiver detects transitions at the observation times, and the absence of a transition when one is expected represents one of the special conditions. No transition (logically low) represents the End Of Transmission (EOT) condition, and it signals the end of the data stream. No transition (logically high) represents the Mumble (MBL) condition, and it is used as a signal that a problem has occured. The logically high condition is dominant; if a logically high condition appears on the data path at the same time as a logically low condition, the receive units will detect only the logically high condition. This situation occurs naturally if the data path 20 uses electrical levels which have a correspondence to logical levels as in an open collector active low signal arrangement. The dominance constraint must be imposed artificially if the data path uses frequencies corresponding to logical levels.

The bit stream from the data path 20 goes to the code translator 58 and to the collision detector 60. The collision detector 60 compares the signal from the data path 20 with a signal received directly from the transmit unit 26. The collision detector 60 includes circuitry to compensate for loading effects on the data path 20. Another signal from the transmit unit 26 informs the collision detector 60 when the associated transmit unit 26 is transmitting. When the collision detector 60 detects a difference between the signal received from the data path 20 and the signal received directly from the transmit unit 26 (after compensation for loading effects on the data path) and when the transmit unit 26 is transmitting, the collision detector sends a collision detected signal to the control unit 28.

The signal from the data path 20 also goes to the code translator 58. The code translator 58 extracts the timing information from the incoming stream, and it determines the condition of each information digit. The detection of either of the two special conditions on the data path 20 results in a signal on the corresponding line from the code translator 58. The detection of either of the two bit transmission conditions on the data path results in the appropriate logical signal on the bit stream line and a strobe signal on the bit stream strobe line, both from the code translator 58. For the preferred embodiment using a Manchester code, a continuous logically low signal from the data path is translated into an active signal on the End Of Transmission (EOT) line from the code translator 58. A continuous logically high signal from the data path is translated into an active signal on the Mumble (MBL) line from the code translator 58. A transition on the data path at the appropriate time is translated into the appropriate logical level on the bit stream output from the code translator 58, and the bit strobe line is used to signal that a valid logical bit is available. The EOT and MBL signals go to the control unit 28. The EOT also goes to the associated component 14. The MBL also goes to the slave state latch 64. The EOT, MBL, bit stream and bit strobe lines are inputs to the bit stream routing 62.

The bit stream routing section 62 routes the translated bit stream to the appropriate section of the receive unit 24 or to the associated system component 14. It receives signals from the link state latch 64 which indicate the present state of the link. It receives a signal from the arbitration unit 30 to indicate if the associated system component 14 is the designated link master, and it receives a signal from the slave state latch 62 to indicate if the associated system component 14 is a designated link slave. The section 62 uses the signals which indicate the state of the link and the state of the associated system component to determine where the bit stream should go. The bit stream contains one more item of information which is required for routing. The incoming bit stream may contain a command word which is used for controlling the link. These link level command words may be distinguished from other bit streams by the first information bit in the stream. The preferred embodiment uses a logical one first bit to indicate that the bit stream is a command word. A logical zero first bit indicates that the bit stream is not a command word. This additional item of information completes the set of information required to route the bit stream.

The bit stream routing section 62 can route the bit stream to the address comparitor 70, to the command decoder 66, to the associated system component 14, or it can block the bit stream transfer. If the bit stream is identified as a command word, the command active line to the command decoder 66 is made active, and the remainder of the bit stream is sent to the command decoder 66 using a bit strobe line and a bit stream line. The next EOT or MBL received by the bit stream routing section 62 causes the command active line to the command decoder 66 to become inactive. If the bit stream is identified as something other than a command word, the bit stream routing section 62 must take one of the other three possible actions. If the link state is such that the information to be sent is a slave address, the address active line to the address comparitor 70 is made active, and the bit stream is sent to the address comparitor 70 using a bit strobe line and a bit stream line. The next EOT or MBL received causes the address active line to become inactive. If the link state is such that the information to be sent represents data transfers from the link master to a link slave, and if the associated component 14 is a designated link slave, then the bit stream is routed to the associated system component 14. If the link state is such that the information to be sent represents data transfers from a link slave to the link master, and if the associated component 14 is the designated link master, then the bit stream is routed to the associated component 14. For all other conditions, the bit stream routing section blocks transfer of the bit stream.

An active signal on the address active line causes the address comparitor 70 to operate. A bit stream to be interpreted as an address is sent to the address comparitor 70 one bit at a time as each bit passes through the bit stream routing section. As each bit is strobed to the address comparitor 70 by the routing section, the address comparitor 70 strobes the address bit request line to the associated system component 14. The address comparitor 70 takes the input address bit from the associated system component 14 and compares it with the address bit from the routing section 62. Slave addresses arrive on the data path serially with the least significant bit arriving first. The address comparison is made bit by bit starting with the least significant bit until the address active line becomes inactive. Each time the address comparitor 70 strobes an address bit in from the associated system component it puts the bit on the ID bit stream line and strobes the ID bit strobe line, both lines to the arbitration unit 30. The address comparitor 70 generates an active pulse on the match line to the slave state latch 64 when the address active line becomes inactive if every bit from the routing section matched every bit from the associated system component 14. Address bit streams do not have fixed lengths, and the associated system component 14 may provide logical zeros when the number of address bits requested by the address comparitor 70 exceeds the number of bits that the system component 14 is prepared to provide.

An active signal on the command active line causes the command decoder 66 to operate. The command decoder 66 determines to which of a set of possible link commands the particular bit string corresponds. The decoder 66 performs any detection and correction of errors in the command bit stream which the command encoding technique supports. The preferred embodiment encodes the commands using bit streams of fixed length which include means for local correction of single bit errors in the bit stream and for local detection of double bit errors in the bit stream. A logical pulse is generated on the appropriate output command line when the command active line becomes inactive. If the input bit stream is not recognized as a valid command after any applicable error correction, then no output command line pulses are generated. The detection of an uncorrectable error also prevents the generation of an output command line pulse. Some of the commands are used to change the link state, and the output lines corresponding to these commands provide inputs to the data path state latch 68. One command is used to signal the End Of a Function (EOF), and the output command line associated with this command provides a signal to the Arbitration unit 30. Another command is use to indicate that the data to follow is a slave identification address (SID), and the output command line associated with this command provides a signal to the slave state latch 64. The EOF signal also goes to the slave state latch 64.

The link state latch 64 stores the current state of the link. The preferred embodiment provides for four possible states: (1) Master sends data to slave (MSD); (2) Slave sends data to master (SSD); (3) Master sends slave identification address (SID); and (4) Data path not in use (NUL). Link state controlling command words are used to switch link states. The link state latch 64 provides the currently latched link state to the bit stream routing section 62 and to the associated system component 14. The link state latch provides an active signal on the link inactive line to the arbitration unit 30 when the link state is such that the data path 20 is not in use.

The slave state latch 64 provides an output to the bit stream routing section 62 and to the control unit 28 to indicate when the associated system component 14 is designated as a link slave. This latch 64 is set when it receives a logical pulse on the match line from the address comparitor 70. The latch 64 is cleared when it receives a logical pulse on either the End of Function (EOF) command line or the slave identification command line (SID) from the command decoder 66. The slave state latch 64 is also cleared by an active to inactive transition on the MBL line from the code translator 58.

Figure 7:
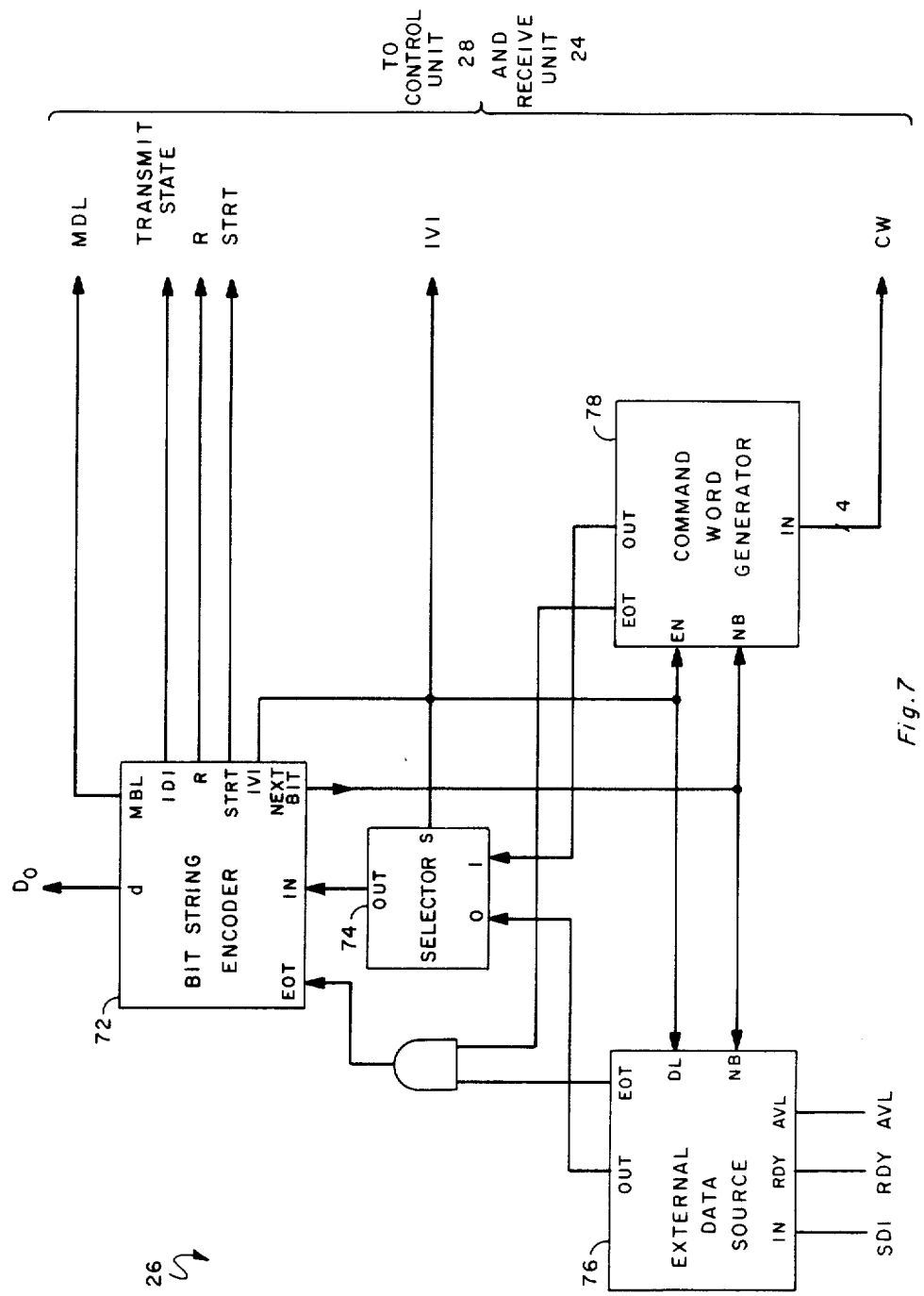
FIG. 7 is a detailed schematic diagram of link port's transmit unit.

In FIG. 7 the transmit unit 26 of the port is shown. The transmit unit 26 is the source of all signals from the port 12 to the data path 20. It accepts signals to be transmitted as well as control signals from the control unit 28. In the preferred embodiment it may output the $D_o$ signal to a buffer driver which electrically interfaces to the data path 20. The transmit unit 26 also coordinates the transfer of sequential bit strings from the Associated component 14 through the control unit 28. The transmit unit 26 encodes all signals in any one of several possible formats which are determined by the specific realization of the invention. The coding of the command words for link state control is also provided by the transmit unit 26.

There are at least six types of signals that may be produced by the transmit unit 26. These are (1) the command word header, (2) the bit string header, (3) the command word, (4) the end of transmit signal (EOT), (5) the mumble signal (MBL), and (6) bit strings. The command word header indicates that the following bit string is of fixed length and is to be interpreted as a link level command word. Similarly, the bit string header indicates that the following bit string is of variable length and may be used either as a port identifier or passed to the system level. The command word is a fixed length word which is interpreted by the ports to alter link state. It may incorporate error detection and correction coding. The end of transmit (EOT) signal defined the end of a particular message. The end of function signal (EOF) indicates that the current master is relinquishing control of the link. The mumble (MBL) signal is used to indicate an error condition or interrupt. The bit string can be of any length within time constraints and is either a port identification to be monitored by the link level or a system level data string to be passed to the system level master or slave device.

The input/output signals thru the control unit 28 to the Associated component 14 are used to conduct the bit string transfer between the port 12 and the component 14. The bits are supplied to the transmit unit 26 from the component 14 as levels on the "sdi" input line. Timing may be governed by the "rdy" and "avl" signals. The "avl" signal is asserted by the component 14 when the signal on the "sdi" line is ready to be accepted by the transmit port 26. The signal on the "rdy" line is set by the transmit unit 26 when it is prepared to accept a new bit from the component 14 system level. The system level indicates to the transmit unit 26 that the bit string is completed by failing to assert the "avl" line.

In FIG. 7 various lines connect the control unit 28 and the receive unit 24 to the transmit unit 26. The "lvl" signal from the control unit 28 is active if the signal to be sent by the transmit unit 26 is a command word. The "lvl" signal is inactive if a system level bit string is to be sent. The "cw" input signal from the control unit 28 is a multibit message defining the command word that is to be sent. The "strt" signal from the control unit 28 specifies when the transmit unit 26 should begin its operation. The "R" input is a multibit message specifying the data rate of all output signals on the data path. The "mbl" input signal is used to cause an MBL data path signal and overrides all other controls. The "tx" state is active from the beginning of the "strt" input signal to the end of the operation of the transmit unit.

The transmit unit 26 can comprise four elements which support its functions. These are (1) the bit string encoder 72, (2) the external data source 76, (3) the command word generator 78 and (4) the message type selector 74. The bit string encoder 72 produces the command word and bit string headers, the EOT and MBL signals, and formats the message bits. The external data source 76 manages the asynchronous protocol between the port 12 and the associated component 14 for transfer of bit strings. The command word generator 78 produces the complete command word including error correcting and detecting bits as a function of the "cw" inputs. The message type selector 74 chooses either the external data source or the command word generator depending on the value of the "lvl" signal.

Figure 8:
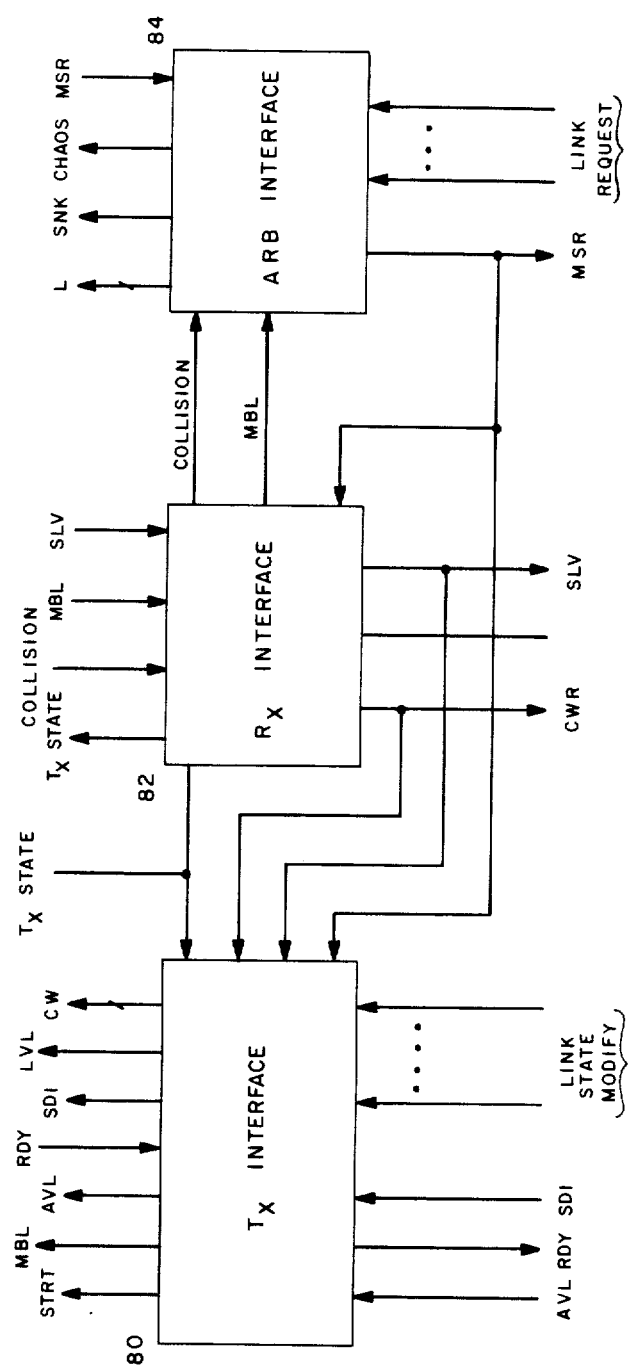
FIG. 8 is a detailed schematic diagram of a link port-'control unit.

In FIG. 8 the control unit 28 is shown. The control unit interfaces the port 12 to the associated component 14 and coordinates the activities of the arbitration unit 30, the transmit unit 26 and the receive unit 24. The control unit 28 comprises three sections. These are the (1) Tx interface 80, (2) the Rx interface 82, and (3) the Arb interface 84. The Tx interface 80 provides the control signals to the transmit unit 26 and accepts the inputs from the associated component 14 which are directed toward the sending of serial data on path 20. The Rx interface 82 connects to the receive unit 24 and provides indications to the associated component 14 of the link state and the possible slave status of the port 12. The Arb interface 84 connects to the arbitration unit 30 and accepts the link request signals from the component 14 while providing master status indications.

The Tx interface 80 transfers serial data from the associated component 14 to the transmit unit. The "avl", "rdy", and "sdi" signals coorespond to the same signals of the transmit unit 26. The Tx interface 80 inhibits these signals to associated component 14 unless the port 12 has either master or slave status. These signals are further inhibited if in the slave state unless the link state is such that the slave has permission from the link to transmit. The Tx interface 80 also accepts link state modify commands from the associated component 14 when the port 12 has been granted master status by the link. Upon receipt of a new link state modify signal the "cw" signals are properly encoded and sent to the transmit unit 26, the "lvl" signal is set to accept command words, and the strt signal is sent to the transmit unit 26 to activate the command word generation procedure. A "tx state" signal is received from the transmit unit 26 to indicate when it is active. The link state and the slave status is received from the Rx interface unit 82 and the master status of the port is received from the Arb interface 84.

The Arb interface 84 connects the arbitration unit 30 of the port 12 to the associated component 14 and to the other units of the port. The Arb interface 84 provides the port master status to the system level component 14 and accepts the link request signals from it. These signals are encoded to produce the L signal set which is applied directly to the arbitration unit 30. The chaos signal is produced from the "mbl" and collision signals which are received from the Rx interface 82. The SNK signal is produced whenever the ARB interface 84 determines that the arbitration state of the link is different from that recorded in the link state registers of the arbitration unit 30. The chaos signal is active when the port is master and is transmitting and a collision occurs. The Arb interface 84 converts the link request signals from the associated component 14 to the L signals for the arbitration unit 30.

In summary the embodiment described above is believed to provide a robust and efficient communications network. It provides a network adaptable to control and monitoring applications, that is, to applications characterized by numerous short messages and traffic density that varies widely in time and urgency. It also provides a network which is economical in nature, that is, which is made up of components which themselves are not expensive, and which is easily adaptable to connection with many other components. Moreover, it provides for rapid, accurate arbitration of bus access, and permits bus access at a variety of urgency levels. Additionally, it includes a simple, efficient handshaking protocol for dialog between system components, and provides a framework within which further link functions can be developed easily.

Industrial Applications

The invention may be applied to any communication network employing controllers, sensors and controlled devices. It will improve the performance of any control system of distributed components, including industrial production processes, energy systems such as heating and air conditioning and alarm or monitoring systems.

Equivalents

Although the invention has been described above in connection with a preferred embodiment, it should be recognized that various modifications can be made by those skilled in the art without departing from the spirit and scope of the invention. For example, the assignment of specific functions to specific elements (i.e. the arbitration unit) in our preferred embodiment can be revised by those skilled in circuit design. Various changes can be made in the number or type of command word to meet the needs of particular applications. Additionally the number of immediacy levels and serial paths, as well as their specific implementations, may be modified. Moreover, each port need not include all the functions described in the preferred embodiment.

What we claim is:

1. An asynchronous digital data link for establishing communications among a plurality of components associated with the link, the link comprising at least two serial paths, a data path used for communicating data and a control path used for transmission of link access request signals, and a plurality of ports, each port connected to an associated component and each port comprising:

(a) a data receiver connected to the data path and the associated component to receive data from the data path and convey such data to the associated component;

(b) a data transmitter connected to the data path and the associated component to convey data from the component and transmit the data to the data path when activated;

(c) means connected to the link for generating an end of function signal indicating the end of a data communication;

(d) means connected to the link for detecting an end of function signal;

(e) a control transmitter connected to the control path for generating access request signals of at least one priority class on request of the associated component;

(f) an arbitration unit connected to the control path consisting of
   (i) at least one register means for maintaining the number of pending bus access requests, and
   (ii) means for incrementing and decrementing said register means, in response to access request signals and end of function signals; and (g) a control unit connected to the arbitration unit, data receiver, data transmitter, control transmitter and associated component, the unit comprising:
   (i) enabling means connected to the register means of the arbitration unit for indicating to the associated component that, no other component has a pending request of higher priority and that, within its request signal class, no other component has an earlier request for bus access, and
   (ii) conveying means responsive to the enabling means for conveying data from the component to the transmitter for transmission to the data path.

2. The link of claim 1 wherein at least one of the ports further comprises: means for transmitting command words on the data path; and wherein each of the ports further comprises means for receiving and interpreting such command words to determine the link status, whereby a component associated with a port having the means for transmitting command words can assume the role of link master and communicate data and changes in link status to other components.

3. The link of claim 2 wherein the command words comprise a slave identification word and a master-sends-data word, whereby a link master can address specific components associated with the link and transmit data thereto.

4. The link of claim 2 wherein the command words comprise a slave identification word and a slave-sends-data word, whereby a link master can address specific components associated with the link and demand data therefrom.

5. The link of claim 1 wherein the means for generating an end-of-function signal and the means for detecting such signals are connected to the data path.

6. The link of claim 1 wherein the means for generating an end-of-function signal and the means for detecting such signals are connected to the control path.

7. The link of claim 1 wherein the means for generating an end-of-function signal and the means for detecting such signals are connected to a third serial signal path.

8. The link of claim 1 wherein the means for generating an end-of-function signal comprises a means for generating a sufficiently long, uninterrupted signal and the means for detecting such signals comprises a means for measuring the length of uninterrupted signals.

9. The link of claim 1 wherein each port further comprises penalty means for inhibiting its control transmitter for a fixed period of time whenever there are pending bus access requests and the data transmission has exceeded a pre-determined length.

10. The link of claim 1 wherein each port further comprises null-synchronization means for determining that data transmissions on the link has been absent for a sufficiently long period of time and means for initializing the registers of the arbitration means in response thereto.

11. The link of claim 1 wherein both the data and control paths comprise of wires.

12. The link of claim 1 wherein the data and control paths comprise frequency multiplexed signals on a common medium.

13. The link of claim 12 wherein the common medium comprises a coaxial cable.

14. The link of claim 12 wherein the common medium comprises wires also used for distribution of electric power.

15. The link of claim 1 wherein the control transmitter further includes means for generating request signals of at least two classes, and ordinary request signal and a priority request signal and the arbitration unit further includes at least one further register means for maintaining the number of pending priority bus access requests.

* * * * *